United States Patent
Kitada

(10) Patent No.: US 8,429,262 B2
(45) Date of Patent: Apr. 23, 2013

(54) COMMUNICATION SYSTEM USING MULTIPLE TYPES OF COMMUNICATION MODES, COMMUNICATION TERMINAL, COMPUTER PROGRAM, AND COMMUNICATION METHOD

(75) Inventor: Naruhide Kitada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 415 days.

(21) Appl. No.: 12/711,155

(22) Filed: Feb. 23, 2010

(65) Prior Publication Data

US 2010/0217851 A1    Aug. 26, 2010

(30) Foreign Application Priority Data

Feb. 25, 2009 (JP) ................................. 2009-041656

(51) Int. Cl.
*G06F 15/16* (2006.01)
*G06F 15/173* (2006.01)

(52) U.S. Cl.
USPC ........................... 709/223; 709/204; 709/224

(58) Field of Classification Search .......... 709/204–207, 709/223–224, 227–228
See application file for complete search history.

(56) References Cited

U.S. PATENT DOCUMENTS

| | | | |
|---|---|---|---|
| 6,446,127 B1 * | 9/2002 | Schuster et al. | 709/227 |
| 7,324,223 B1 | 1/2008 | Mori | |
| 7,483,525 B2 * | 1/2009 | Chaddha et al. | 379/142.07 |
| 7,921,214 B2 * | 4/2011 | Da Palma et al. | 709/227 |
| 2004/0267887 A1 * | 12/2004 | Berger et al. | 709/206 |
| 2006/0129643 A1 * | 6/2006 | Nielson et al. | 709/206 |
| 2007/0005724 A1 | 1/2007 | Hirai et al. | |
| 2007/0136422 A1 | 6/2007 | Ohtani et al. | |
| 2008/0137628 A1 | 6/2008 | Matsumoto et al. | |
| 2009/0003551 A1 * | 1/2009 | MacIsaac | 379/88.21 |
| 2009/0172105 A1 * | 7/2009 | Cruz et al. | 709/224 |
| 2009/0181702 A1 * | 7/2009 | Vargas et al. | 455/466 |
| 2009/0271440 A1 * | 10/2009 | Van Steenbergen et al. | 707/104.1 |
| 2010/0115084 A1 * | 5/2010 | Caspi et al. | 709/224 |

FOREIGN PATENT DOCUMENTS

| | | |
|---|---|---|
| JP | 2000-184118 A | 6/2000 |
| JP | 2007-166322 A | 6/2007 |
| JP | 2008-148057 A | 6/2008 |
| WO | WO 2005/053298 A1 | 6/2005 |

* cited by examiner

*Primary Examiner* — Joshua Joo
(74) *Attorney, Agent, or Firm* — Kilpatrick Townsend & Stockton LLP

(57) ABSTRACT

A communication system includes multiple communication terminals that are used by multiple users; and a management unit that holds management information expressing which type of communication mode corresponding to which communication address information is used by which user and by which communication terminal, and connection information including communication address information of one communication terminal that has communicated and communication address information of the other communication terminal that has communicated. The management unit holds connection information corresponding to an instance of communication even if that instance of communication has ended. Each communication terminal can communicate with other communication terminals in one or more types of communication modes, and includes a communication support unit.

6 Claims, 5 Drawing Sheets

FIG. 3A

| 0x0-xxxx-xxxx | 0x0-xxxx-yyyy |

FIG. 3B

| | | |
|---|---|---|
| TELEPHONE xxxx | COMMUNICATION ADDRESS INFORMATION | 0x0-xxxx-xxxx |
| | COMMUNICATION MODE NAME | AUDIO TELEPHONY |
| | USERNAME | USER A |
| TELEPHONE yyyy | COMMUNICATION ADDRESS INFORMATION | 0x0-xxxx-yyyy |
| | COMMUNICATION MODE NAME | AUDIO TELEPHONY |
| | USERNAME | USER B |
| SHARED CONFERENCE SYSTEM | COMMUNICATION ADDRESS INFORMATION | xxx.xxx.xxx.xxx |
| | COMMUNICATION MODE NAME | CONFERENCE |
| | LOCATION INFORMATION | CONFERENCE ROOM |
| PC yyyy | COMMUNICATION ADDRESS INFORMATION | xxx.xxx.xxx.yyy |
| | LOCATION INFORMATION | OFFICE ROOM |
| | COMMUNICATION MODE NAME | CONFERENCE |
| | USERNAME | USER B |
| PC yyyy | COMMUNICATION ADDRESS INFORMATION | yyyy@xxxx.xx.xx |
| | LOCATION INFORMATION | OFFICE ROOM |
| | COMMUNICATION MODE NAME | E-MAIL |
| | USERNAME | USER B |

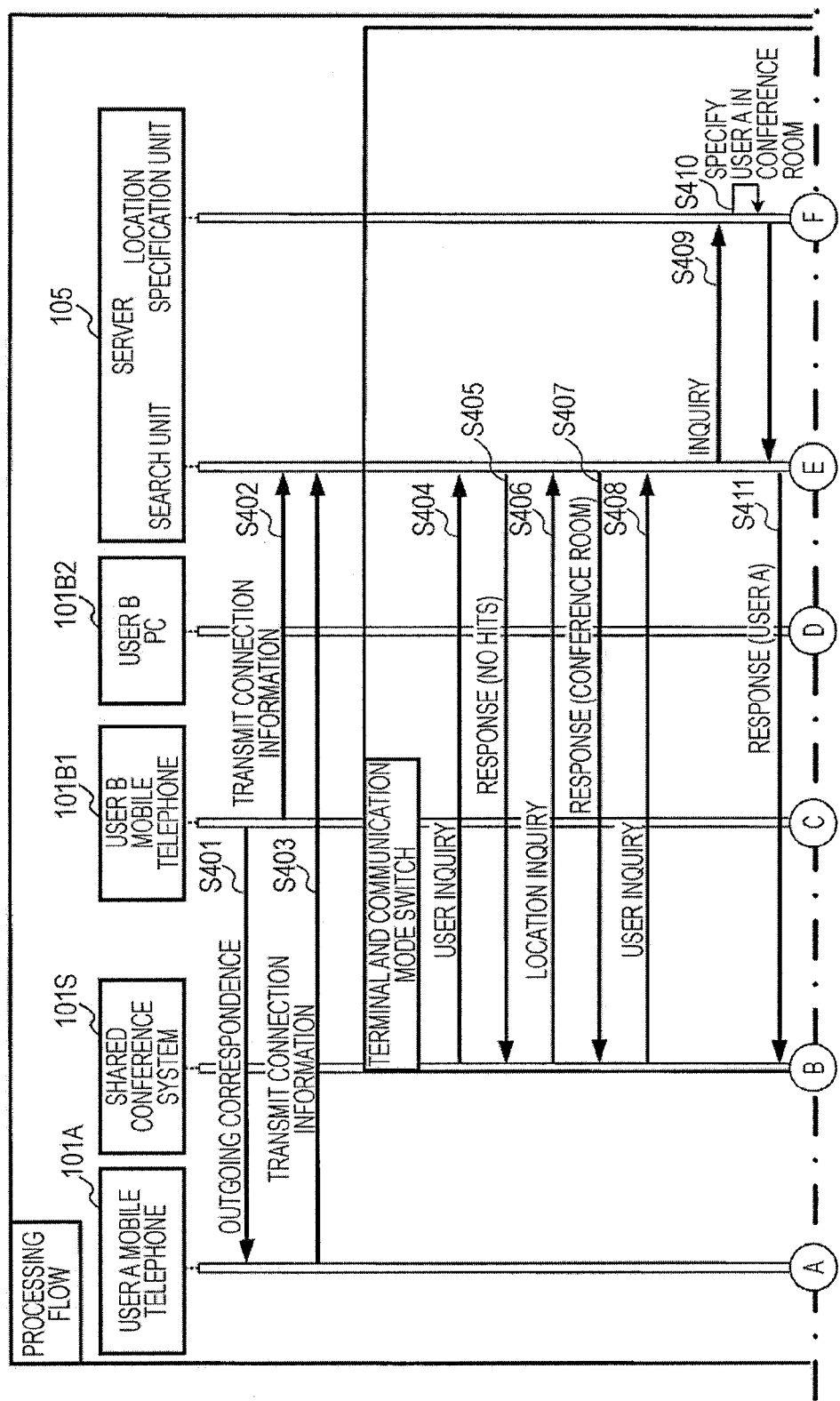

COMMUNICATION SYSTEM USING MULTIPLE TYPES OF COMMUNICATION MODES, COMMUNICATION TERMINAL, COMPUTER PROGRAM, AND COMMUNICATION METHOD

BACKGROUND

1. Technical Field

The present invention relates to communication in which multiple types of communication modes are used.

2. Related Art

Multiple types of communication modes are known, including telephone, videophone, fax, e-mail, and conference calling. Selecting the optimal communication mode from among these multiple types of communication modes can be a troublesome process for a user.

Accordingly, in, for example, JP-A-2007-166322, a server executes presence management when a session has been established between client terminals, managing which communication method can be used by each client terminal; presence information expressing what communication methods can be used by one of the client terminals is provided to the other client terminal.

Furthermore, in, for example, International Publication NO 2005/053298 pamphlet, in order to switch from a telephone function to a fax function, the telephone device of one user acquires the fax number of the fax terminal of another user from the telephone device of that other user, transmits the acquired fax number to the fax terminal of the one user, and the fax terminal of the one user then transmits a fax to the received fax number.

A case is conceivable where, for example, one user attempts to switch the communication mode s/he is using with another user from conversation over mobile telephones (telephony) to videoconferencing using personal computers.

In such a case, using the technique described in JP-A-2007-166322, the one user can discover the communication methods that the mobile telephone of the other user can use by viewing the presence information provided by the server, and then execute one of those communication methods. However, with this technique, it is necessary for the one user to identify the communication method that should be executed by the mobile telephone of the other user by him/herself, and furthermore, the one user cannot discover information regarding communication terminals aside from the mobile telephone of the other user.

Meanwhile, in the same case, using the technique described in International Publication NO 2005/053298 pamphlet, the one user can discover communication address information regarding communication terminals aside from the mobile telephone of the other user. However, the one user can only discover communication address information regarding communication terminals aside from the mobile telephone of the other user from the mobile telephone that the other user is currently using. In order to discover the communication address information after the conversation using the mobile telephone has ended, it is necessary to once again initiate a conversation using the mobile telephone.

SUMMARY

It is an advantage of some aspects of the invention to enable switching from a second communication mode to a first communication mode for the use even after communication between users in the second communication mode has ended.

In an aspect of the invention, a management unit that holds management information expressing which type of communication mode corresponding to which communication address information is used by which user and by which communication terminal, and connection information including communication address information of one communication terminal that has communicated and communication address information of the other communication terminal that has communicated, is provided. The management unit holds connection information corresponding to an instance of communication even if that instance of communication has ended. Note that the management unit may be any type of device. For example, the management unit may be provided in one of the communication terminals, may be provided in a server that can communicate with each communication terminal, or may be provided in an interchanger that relays communication between communication terminals (for example, a telephone interchanger). Note that the communication address information is address information used in communication; to be more specific, this information is, for example, a telephone number, an e-mail address, a facsimile number, an IP (Internet Protocol) address, or the like.

Each communication terminal can communicate with other communication terminals in one or more types of communication modes, and includes a communication support unit. The communication terminals may be any type of device as long as that device has a communication function. To be more specific, the communication terminal is, for example, a personal computer, a mobile telephone, a projector, a facsimile device, or the like. As described before, various types of modes exist as communication modes, such as, for example, telephone, e-mail, conference calling, and so on.

A communication support unit is provided, and in the case where a first-type communication mode of a first communication terminal that includes that communication support unit is used by a first user, the communication support unit accesses the management unit to specify communication address information corresponding to the first-type communication mode of a second communication terminal used by a second user. The first communication terminal communicates with the second communication terminal in the first-type communication mode using the specified communication address information.

The first user is a user that used a second-type communication mode prior to using the first-type communication mode of the first communication terminal. Communication in the second-type communication mode may be performed by the first communication terminal, or may be performed by a communication terminal that is different from the first communication terminal.

The second user is a user that communicated with the first user using the second-type communication mode prior to using the first-type communication mode of the first communication terminal. Communication in the second-type communication mode may be performed by the second communication terminal, or may be performed by a communication terminal that is different from the second communication terminal.

The above specified communication address information is communication address information specified based on an instance of communication address information within the connection information that has another instance of communication address information corresponding to the second-type communication mode used by the first user, and based on the management information. Specifically, for example, the following processes (A) through (E) are performed.

(A) the first user is specified as the user that uses the first communication terminal based on the management information;

(B) the connection information having the communication address information of the communication terminal used by the first user specified in (A) is specified;

(C) the communication terminal having the other communication address information in the connection information specified in (B) is specified from the management information;

(D) the user of the communication terminal specified in (C) is specified from the management information (the user specified in this (D) is the aforementioned second user); and (E) the user specified in (D) and the communication address information corresponding to the first-type communication mode, which is the communication mode that is to be used, are specified from the management information (the communication address information specified in this (E) is the aforementioned communication address information specified for the second user).

The specification of the communication address information may be performed by the management unit based on an inquiry from the first communication terminal, or may be performed by the first communication terminal based on management information, connection information, or the like from the management unit. In addition, the processes in each of the aforementioned (A) through (E) may be performed as responses made by the management unit according to inquiries from the first communication terminal, or the aforementioned processes (A) through (E) may be performed by the management unit as a response to a single inquiry from the first communication terminal, made in accordance with a search procedure defined in that inquiry (or a search procedure defined in advance in the management unit).

BRIEF DESCRIPTION OF THE DRAWINGS

The invention will be described with reference to the accompanying drawings, wherein like numbers reference like elements.

FIG. 3A illustrates the configuration of connection information according to an embodiment of the invention.

FIG. 3B illustrates the configuration of management information according to an embodiment of the invention.

FIG. 4 illustrates part of the flow of processing according to an embodiment of the invention.

DESCRIPTION OF EXEMPLARY EMBODIMENTS

Figure 1:
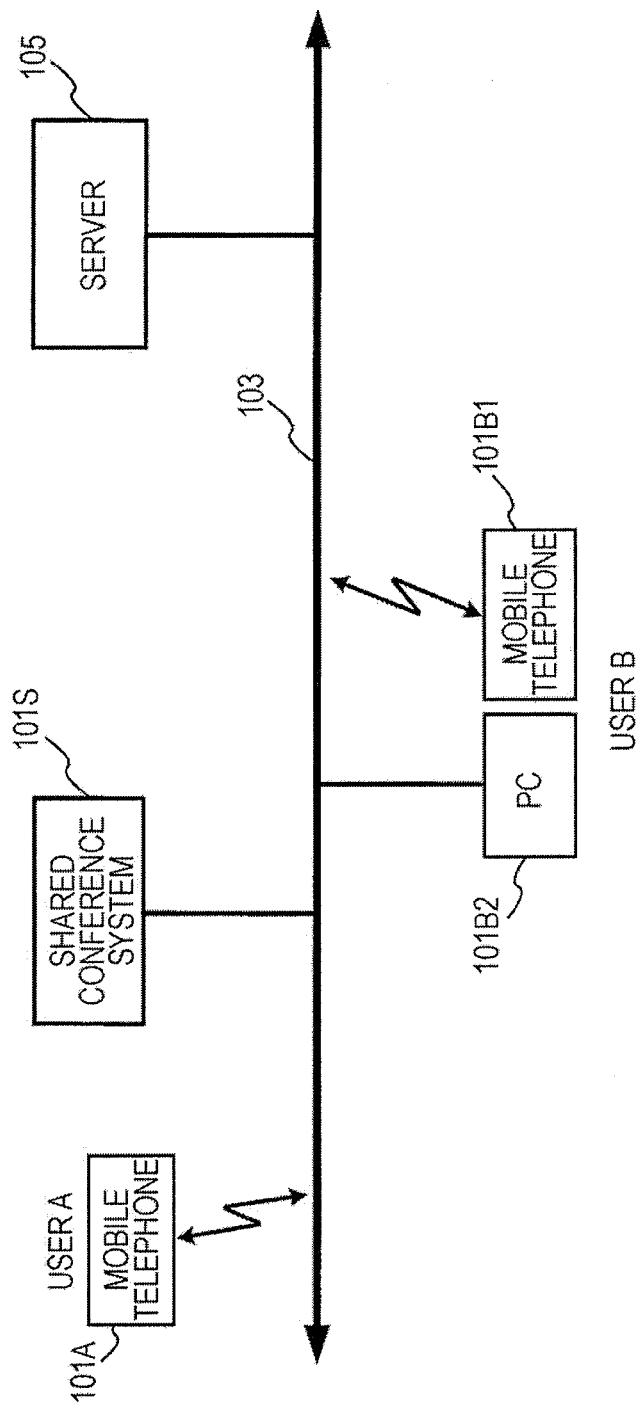
FIG. 1 illustrates a communication system according to an embodiment of the invention.

FIG. 1 illustrates a communication system according to an embodiment of the invention. Note that in the following descriptions, constituent elements of the same type will be given identical parent numerals, and child numerals will be added to the parent numerals in cases where constituent elements are to be distinguished from each other.

This embodiment is an embodiment that describes, as an example, a case in which a user A receives a telephone call from a user B, moves to a conference room, and then carries out a conference with the user B using a shared conference room system. Accordingly, the multiple users are the user A and the user B, and the multiple communication terminals are a mobile telephone 101A and a shared conference system 101S used by the user A and a mobile telephone 101B1 and a personal computer (PC) 101B2 used by the user B.

The communication terminals 101A, 101S, 101B1, and 101B2 can communicate with each other via a communication network 103. The communication network 103 is a mixed network in which multiple types of communication networks, such as a telephone network, the Internet, and so on coexist, but in cases aside from the case described above, this network may be a single type of communication network.

A server 105 is connected to the communication network 103. The server 105 manages connection information expressing which communication terminals have carried out communication with each other, and when the communication mode is to be switched, supports that communication mode switch based on the connection information.

Figure 2:
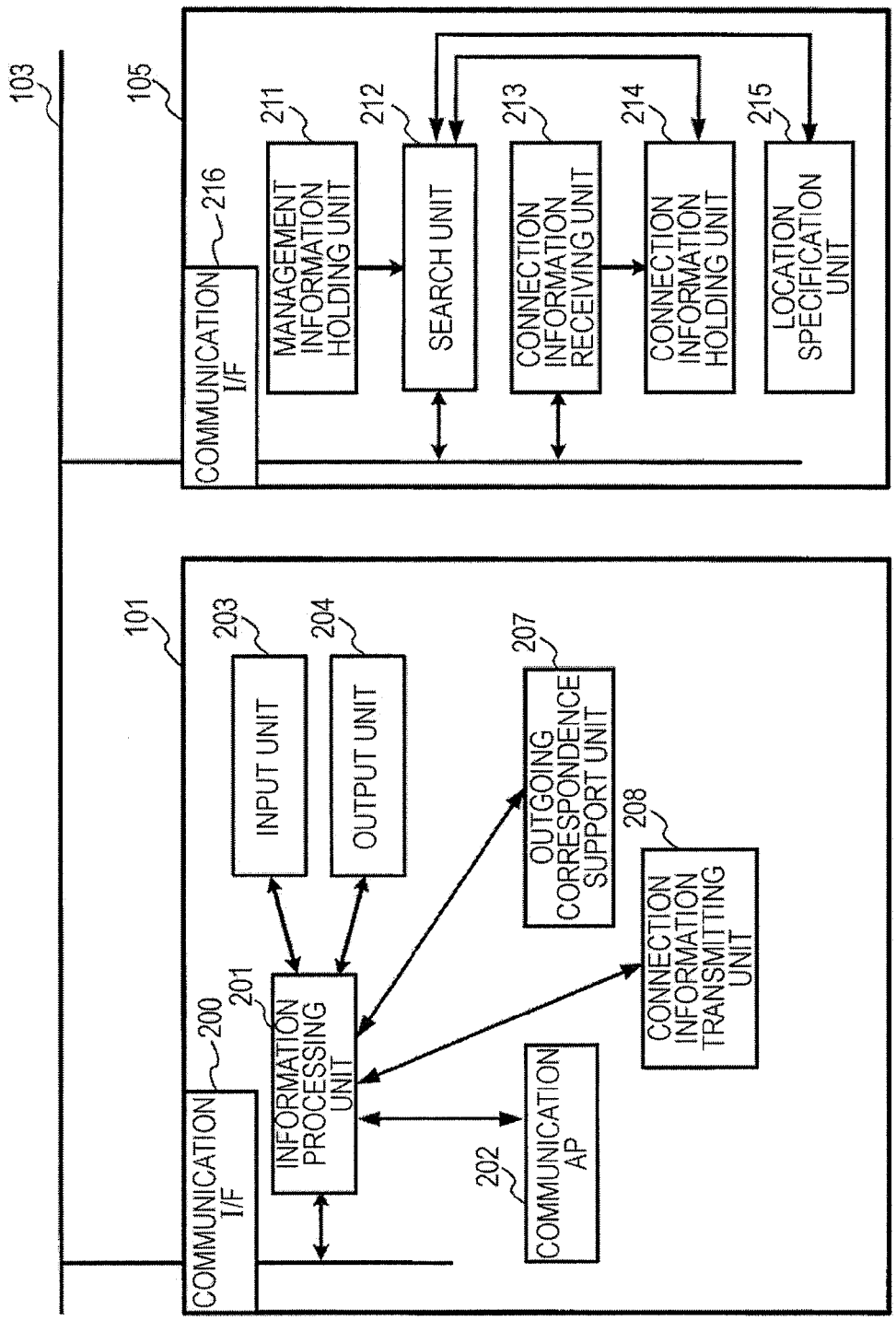
FIG. 2 illustrates function blocks of a mobile terminal and a server according to an embodiment of the invention.

FIG. 2 illustrates functional blocks of the communication terminals 101 and the server 105.

The communication terminals 101 (101A, 101S, 101B1, and 101B2) include a communication interface device (hereinafter, "communication I/F") 200, an information processing unit 201, a communication AP 202, an input unit 203, an output unit 204, an outgoing correspondence support unit 207, and a connection information transmitting unit 208.

The communication I/F 200 is a device for performing communication via the communication network 103.

The information processing unit 201 is, for example, a microprocessor. For example, the information processing unit 201 processes information received via the communication I/F 200, launches the communication AP 202 specified by a user via the input unit 203, controls the operations of that communication AP 202, performs processing in accordance with instructions from the outgoing correspondence support unit 207, the connection information transmitting unit 208, and so on, and the like.

The communication AP 202 is an application program for executing communication in a predetermined communication mode. A user can communicate in his or her desired communication mode by, for example, the information processing unit 201 executing the communication AP 202 corresponding to the communication mode desired by the user. The communication AP 202 can execute outgoing and incoming correspondence. Multiple communication APs 202 may be present within a single communication terminal 101. In the communication terminals 101, a communication AP 202 corresponding to, for example, a communication mode specified by a user via the input unit 203 is executed by the information processing unit 201.

The input unit 203 is an example of a user interface, and includes, for example, operational keys, a keyboard, a mouse, a microphone, or the like. The output unit 204 is another example of a user interface, and includes, for example, a display screen, speakers, or the like.

The outgoing correspondence support unit 207 is, for example, a computer program executed by the information processing unit 201. The outgoing correspondence support unit 207 supports the outgoing correspondence of a user. For example, the outgoing correspondence support unit 207 issues an inquiry to the server 105 in order to identify the communication address information of a partner communication terminal corresponding to a post-switch communication mode. The processing performed by the outgoing correspondence support unit 207 will be described in detail later.

The connection information transmitting unit 208 is, for example, a computer program executed by the information processing unit 201. The connection information transmitting unit 208 transmits connection information. The connection information is configured of the respective communication address information of a communication origin and a communication destination in a single executed communication mode. To be more specific, in, for example, the case where the executed communication mode is telephony, the communication information is configured of the telephone number of the communication terminal that is the communication origin (the outgoing correspondence origin) and the telephone number of the communication terminal that is the communication destination (that is, that received the incoming correspondence), as shown in FIG. 3A.

The server 105 includes a communication I/F 216, a connection information receiving unit 213, a connection information holding unit 214, a management information holding unit 211, a search unit 212, and a location specification unit 215. The holding units 214 and 211 are units that are, for example, realized by memory resources, whereas the other units 213, 212, and 215 are units that are, for example, realized by a microprocessor executing computer programs.

The communication I/F 216 is a device for performing communication via the communication network 103.

The connection information receiving unit 213 receives connection information from a communication terminal 101 via the communication I/F 216, and stores the received connection information in the connection information holding unit 214.

The connection information holding unit 214 stores connection information. The connection information is stored on a communication-by-communication basis. The connection information holding unit 214 stores the connection information corresponding to an instance of communication even after that communication has ended. N instances (where N is an integer of one or more) of connection information (connection information corresponding to at least the latest instance of communication) are held for a single user.

The management information holding unit 211 stores management information. The management information expresses which type of communication mode corresponding to which communication address information was used by which user and by which communication terminal. To be more specific, as shown in FIG. 3B, the management information includes, for example, a terminal ID (for example, "telephone xxxx"), communication address information (for example, "0x0-xxxx-xxxx"), a communication mode name (for example, "audio telephony"), and a user name (for example, "user A"). Furthermore, location information expressing the location of a communication terminal (for example, "conference room") is included for, for example, stationary-type communication terminals.

The search unit 212 searches, in response to an inquiry from a communication terminal 101, for communication address information of the communication terminal suited to communication in the post-switch communication mode based on the connection information held in the connection information holding unit 214, the management information held in the management information holding unit 211, and so on. The processing performed by the search unit 212 will be described in detail later.

The location specification unit 215 specifies the location of a communication terminal 101, the location of a user, and so on. For example, as the method for identifying the location of a communication terminal 101 and/or a user, a method that refers to user schedule information expressing the schedule of a user, a method that acquires location information obtained through a GPS (Global Positioning System) function of a mobile telephone (for example, latitude/longitude information), or the like can be employed.

Figure 5:
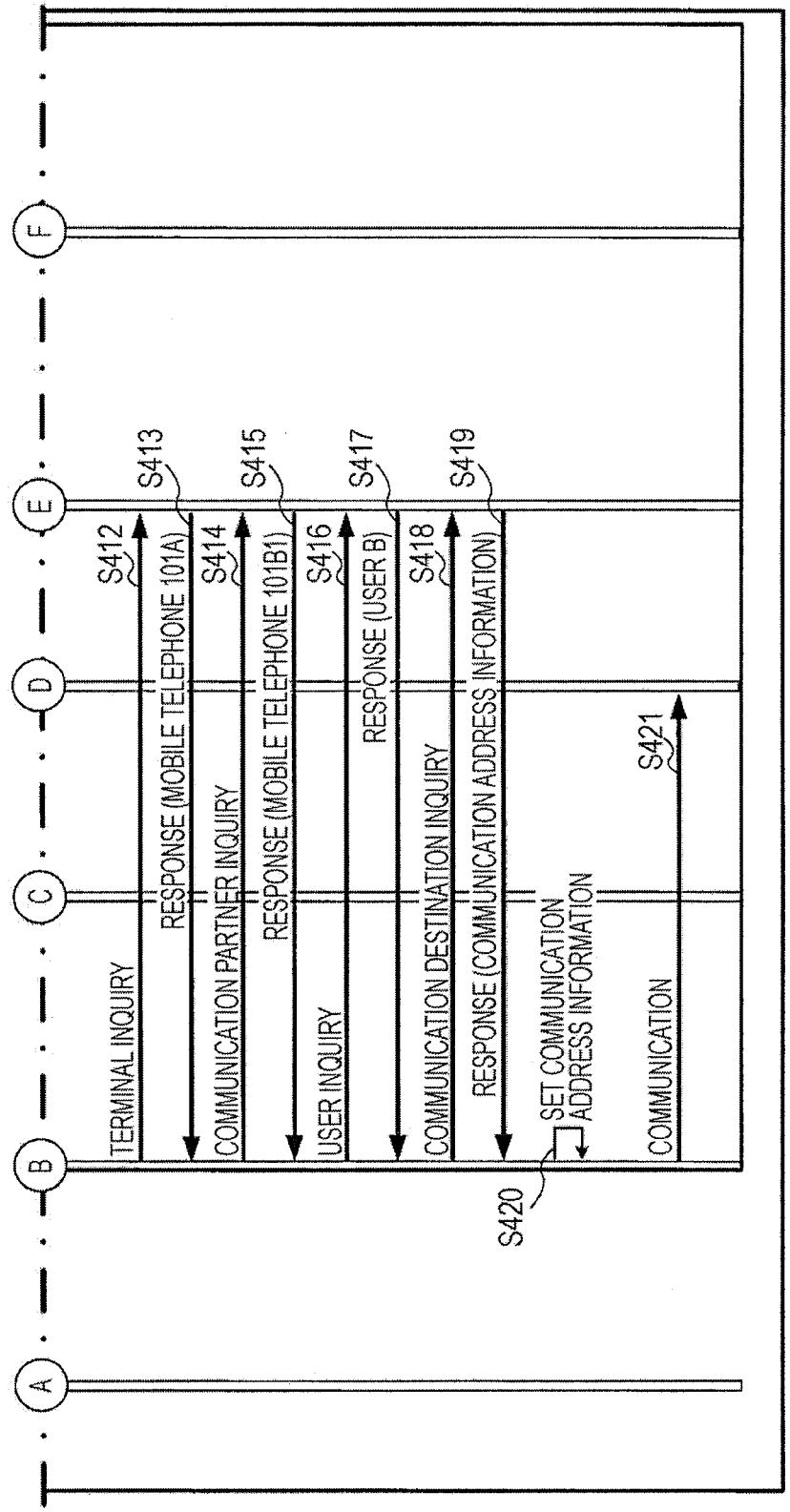
FIG. 5 illustrates the remainder of the flow of processing according to an embodiment of the invention.

Hereinafter, the flow of processing performed in this embodiment will be described with reference to FIGS. 4 and 5.

The mobile telephone 101B1 of the user B makes an outgoing transmission to the mobile telephone 101A of the user A (S401). The connection information transmitting unit 208 within the mobile telephone 101B1 that made the outgoing transmission transmits connection information to the server 105 (S402). The communication address information of the communication origin in this connection information is the telephone number of the mobile telephone 101B1, and the communication address information of the communication destination in this connection information is the telephone number of the mobile telephone 101A. The connection information receiving unit 213 of the server 105 receives the connection information, and stores the received connection information in the connection information holding unit 214.

Similarly, the connection information transmitting unit 208 within the mobile telephone 101A that received the call also transmits connection information to the server 105 (S403). Note that it is only necessary for the connection information to be sent from either the communication terminal functioning as the communication origin or the communication terminal functioning as the communication destination.

Assuming the case of this embodiment as described above, the user A then moves to a conference room, and instructs the shared conference system 101S (to be more specific, a single personal computer, for example, that is a constituent element of the shared conference system 101 S) to launch a communication AP 202 for conferences. In response to this instruction, the outgoing correspondence support unit 207 within the shared conference system 101S issues an inquiry to the server 105 (S404). The inquiry includes, for example, requested information, which is information to which an answer is desired. The inquiry issued in S404 is an inquiry as to who the user is that is using the shared conference system 101S, and to be more specific, includes, for example, a terminal ID "shared conference system" and requested information "user".

In response to the inquiry in S404, the search unit 212 within the server 105 searches out the username corresponding to the terminal ID "shared conference system" within the inquiry from the management information within the management information holding unit 211. However, in the exemplary management information illustrated in FIG. 3B, no username is associated with the terminal ID "shared conference system", and therefore no username is found. Accordingly, the search unit 212 returns, to the shared conference system 101S, a response indicating that no hits have been found, or to be more specific, a response that includes, for example, the terminal ID "shared conference system" and user information "no hits" (S405).

The outgoing correspondence support unit 207 within the shared conference system 101S then issues, in response to the response received in S405, a location inquiry, such as an inquiry including the terminal ID "shared conference system" and the requested information "location", to the server 105 (S406).

In response to the inquiry in S406, the search unit 212 within the server 105 searches out the location information corresponding to the terminal ID "shared conference system" within the inquiry from the management information. In the exemplary management information illustrated in FIG. 3B, location information "conference room" is associated with the terminal ID "shared conference system". Accordingly, the search unit 212 returns, to the shared conference system 101S, a response indicating that the conference room has been found, or to be more specific, a response that includes, for example, the terminal ID "shared conference system" and the location information "conference room" (S407).

The outgoing correspondence support unit 207 within the shared conference system 101S then issues, in response to the response received in S407, a user inquiry, such as an inquiry including the location information "conference room" and requested information "user", to the server 105 (S408).

In response to the inquiry in S408, the search unit 212 within the server 105 passes the location information "conference room" in that inquiry to the location specification unit 215, and inquires with the location specification unit 215 as to the user in the location expressed by the location information "conference room" (S409). The location specification unit 215 refers to specification information, specifies the user A as being in the location expressed by the location information "conference room" (S410), and returns the username "user A" to the search unit 212. For example, information containing sets of GPS location information and usernames of mobile phones, entry/exit management information expressing usernames of users that have entered/exited the conference room, entrance times/exit times, and so on, schedule information of the various users, or the like can be employed as the specification information.

The search unit 212 returns, to the shared conference system 101S, a response including the username "user A" returned from the location specification unit 215 and the location information "conference room" (S411).

The outgoing correspondence support unit 207 within the shared conference system 101S then issues, in response to the response received in S411, an inquiry regarding the communication terminal used by the user A, such as an inquiry including the username "user A" and requested information "communication terminal", to the server 105 (S412).

In response to the inquiry in S412, the search unit 212 within the server 105 searches out, from the management information, the communication terminal corresponding to the username "user A" in that inquiry. In the exemplary management information illustrated in FIG. 3B, a terminal ID "telephone xxxx" is associated with the username "user A". Accordingly, the search unit 212 returns a response regarding the communication terminal used by the user A, such as a response including the username "user A" and the terminal ID "telephone xxxx", to the shared conference system 101S (S413).

In response to the response in S413, the outgoing correspondence support unit 207 within the shared conference system 101S issues an inquiry regarding the communication partner terminal of the communication terminal indicated in the response, such as an inquiry including the terminal ID "telephone xxxx" and requested information "communication partner", to the server 105 (S414).

In response to the inquiry in S414, the search unit 212 within the server 105 executes the following processes (1) through (4):

(1) specifying, from the management information, communication address information "0x0-xxxx-xxxx" corresponding to the terminal ID "telephone xxxx" in the inquiry;
(2) specifying connection information having the specified communication address information "0x0-xxxx-xxxx" from within the connection information holding unit 214;
(3) acquiring other communication address information "0x0-xxxx-yyyy" within the specified connection information (see FIG. 3A); and
(4) specifying, from the management information, a terminal ID "telephone yyyy" corresponding to the obtained other communication address information "0x0-xxxx-yyyy". Through this, "telephone yyyy" is specified as the terminal ID of the communication partner terminal for the communication terminal having the terminal ID "telephone xxxx". The search unit 212 then returns, to the shared conference system 101S, a response including the terminal ID "telephone yyyy" of the specified communication partner and the terminal ID "telephone xxxx" (S415).

The outgoing correspondence support unit 207 within the shared conference system 101S then issues, in response to the response received in S415, an inquiry regarding the user of the communication partner terminal returned in the response, such as the terminal ID "telephone yyyy" and requested information "user", to the server 105 (S416).

In response to the inquiry in S416, the search unit 212 within the server 105 specifies, from the management information, a username "user B" corresponding to the terminal ID "telephone yyyy" in the inquiry. The search unit 212 then returns, to the shared conference system 101S, a response expressing that the user of the communication partner terminal is the user B, such as a response including the terminal ID "telephone yyyy" and the username "user B" (S417).

The outgoing correspondence support unit 207 within the shared conference system 101S then issues, in response to the response in S417, an inquiry as to which communication terminal used by the user B should be communicated with in the conference, such as an inquiry including a communication mode name "conference", the username "user B", and requested information "communication address information", to the server 105 (S418).

In response to the inquiry in 5418, the search unit 212 within the server 105 specifies, from the management information, communication address information "xxx.xxx.xxx.yyy" corresponding to the username "user B" and the communication mode name "conference" in that inquiry. The search unit 212 returns, to the shared conference system 101S, a response including the specified communication address information "xxx.xxx.xxx.yyy" (S419).

The outgoing correspondence support unit 207 within the shared conference system 101S sets the communication address information "xxx.xxx.xxx.yyy" included in the response in S417 (S420). At this time, the outgoing correspondence support unit 207 may display a message containing an inquiry such as "OK to connect to terminal 'xxx.xxx.xxx.yyy'?" and accept an instruction as to whether or not to connect from the user A. Alternatively, if, for example, the communication address information is a telephone number, an e-mail address, or the like, the outgoing correspondence support unit 207 may display a screen in which the telephone number, e-mail address, or the like are set as the communication address information of the partner terminal. When an instruction to connect has been received from the user A, the communication AP 202 may then carry out communication using that communication address information (make a call, transmit an e-mail, or the like).

The communication AP 202 within the shared conference system 101S then communicates using the communication address information set in 5420 (S421). In other words, the communication AP 202 uses the communication address information "xxx.xxx.xxx.yyy" to connect to the PC 101B2 used by the user B. This process may be performed upon receiving an instruction to connect from the user A, or may be performed without receiving such an instruction from the user A.

According to the embodiment as described thus far, management information expressing which type of communication mode corresponding to which communication address information was used by which user and by which communication terminal in the server 105. In addition, connection information including the telephone numbers of the mobile telephone 101A of the user A and the mobile telephone 101B1 of the user B, which have been communicating with each other, is transmitted to the server 105 and held in the server 105. The connection information corresponding to that communication remains in the server 105 even after the communication has ended. Accordingly, simply by launching the communication AP 202 of the shared conference system 101S, the user A can connect to the PC 101 B2 of the user B, which can be used in a conference, and carry out a conference with the user B, even after the communication with the user B has ended. To put it simply, switching the communication mode of the communication with the user B can be performed easily and smoothly. Furthermore, as described above, the connection information is held even after the communication has ended, and therefore the communication mode switch can be performed easily and smoothly even in a case such as, for example, where the user A uses a mobile telephone A to transmit an e-mail to the e-mail address of a mobile telephone B of the user B and then makes a telephone call to the mobile telephone B of the user B. In this case, by simply operating the mobile telephone A so as to make a telephone call, the user A can set the telephone number of the mobile telephone B as the outgoing destination telephone number, and can make a call using the telephone number as outgoing destination.

Although a preferred embodiment of the invention has been described thus far, it should be noted that this merely describes an example of the invention, and the scope of the invention is not intended to be limited to the foregoing embodiment. The invention can be realized in other various embodiments.

For example, the connection information transmitting unit 208 may be outside of the communication terminals 101. For example, an interchanger that relays communication between communication terminals 101 may be provided.

In addition, for example, at least one of the management information holding unit 211 and the connection information holding unit 214 may be outside of the server 105.

In addition, for example, in the case where multiple instances of connection information including the communication address information of the mobile telephone 101A have been specified in S414, the terminal IDs of the other communication terminals in the specified multiple instances of connection information may be included in the response in S415. The outgoing correspondence support unit 207 may then display the terminal IDs of the multiple other communication terminals and accept an instruction from the user A regarding the terminal ID of the desired other terminal, prior to the inquiry being issued in S416. In this case, the instructed terminal ID may be included in the inquiry in S416. Alternatively, the terminal IDs of the multiple other communication terminals may be included in the inquiry in S416, and multiple user names corresponding to the multiple terminal IDs may be included in the response in S417. Then, the outgoing correspondence support unit 207 may display the multiple usernames and receive an instruction from the user A regarding a desired username, prior to the inquiry being issued in S418. In this case, the instructed username may be included in the inquiry in S418. Alternatively, multiple usernames may be included in the inquiry in S418, and multiple instances of communication address information may be included in the response in S419. Then, the outgoing correspondence support unit 207 may display the multiple instances of communication address information (and usernames) and receive an instruction from the user A regarding a desired instance of communication address information, prior to the setting made in S420. In this case, the instructed communication address information is set.

Furthermore, although according to S404 through S419, inquiries and responses are made multiple round-trips between the shared conference system 101S and the server 105, those inquiries and responses may, for example, be executed in a single round-trip. In this case, for example, a terminal ID, communication mode name, requested information, and conversion definition information may be included in an inquiry issued by the outgoing correspondence support unit 207. The conversion definition information is information expressing what information will be specified through what sort of procedure, and what sort of information will ultimately be specified. The conversion definition information defines that processing will be executed according to, for example, the procedure from (sequence 1) to (sequence 5) described hereinafter:

(Sequence 1) specifying the user at the communication origin (according to the aforementioned case, the user using the shared conference system 101S is specified as the user A in this (sequence 1));

(Sequence 2) specifying the communication terminal at the communication origin (according to the aforementioned case, the communication terminal used by the user A is specified as the mobile telephone 101A in this (sequence 2));

(Sequence 3) specifying the communication terminal at the communication destination (according to the aforementioned case, the communication terminal that communicated with the mobile telephone 101A is specified as the mobile telephone 101B in this (sequence 3));

(Sequence 4) specifying the user at the communication destination (according to the aforementioned case, the user of the mobile telephone 101B is specified as the user B in this (sequence 4)); and (Sequence 5) specifying the communication address information of the communication terminal to be used as the communication destination (according to the aforementioned case, the communication address information of the communication destination to be used with the user B in the communication mode "conference" is specified in this (sequence 5)).

Upon receiving an inquiry that includes that conversion definition information, the server 105 executes (sequence 1) to (sequence 5) in order based on that conversion definition information, and returns a response including the communication address information thereby specified to the shared conference system 101S. The communication AP 202 within the shared conference system 101S uses that communication address information to carry out communication. According to this example, the inquiries and responses between the shared conference system 101S and the server 105 can be reduced to a single round-trip. Note that the conversion definition information may be pre-defined within the server 105 instead of being included in the inquiry. Furthermore, in the aforementioned case, the user A is not immediately specified in (sequence 1), and thus the search unit 212 specifies the user A based on a conversion table in which the kinds of information that can be obtained in cases where certain kinds of information cannot be obtained are defined. For example, it is assumed that the conversion table holds the "username" and "terminal ID" as kinds of information that cannot be obtained, holds the "location information" as a kind of information that can be obtained in place thereof, and holds the "location specification unit" as information expressing where the information is to be obtained from. In this case, the search unit 212 obtains "conference room" from the location specification unit 215 as the location information of the shared conference system 101S, and then obtains, from the location specification unit 215, "user A" as the username of the user that is in the conference room.

In addition, in the case where, for example, the user of the communication terminal at the communication origin (in the aforementioned case, the shared conference system 101S) cannot be specified from the management information, the user of that communication terminal may be prompted to input his or her username.

The entire disclosure of Japanese Patent Application No. 2009-041656, filed Feb. 25, 2009 is expressly incorporated by reference herein.

What is claimed is:

1. A communication system comprising:
multiple communication terminals that are used by multiple users;
a management unit that holds management information expressing which type of communication mode corresponding to which communication address information is used by which user and by which communication terminal, and connection information including communication address information of one communication terminal that has communicated and communication address information of another communication terminal that has communicated;
a terminal location specification unit that specifies locations of communication terminals; and
a user location specification unit that specifies locations of each of the users,
wherein the management unit holds connection information corresponding to an instance of communication even if that instance of communication has ended;
each of the multiple communication terminals communicates with other communication terminals in one or more types of communication modes, and includes a communication support unit;
in the case where a first-type communication mode of a first communication terminal that includes the communication support unit is used by a first user, the communication support unit accesses the management unit to specify communication address information corresponding to the first-type communication mode in a second communication terminal used by a second user, and the first communication terminal communicates with the second communication terminal in the first-type communication mode using the specified communication address information;
the first user is a user that used a second-type communication mode of a communication origin terminal prior to switching to the first-type communication mode of the first communication terminal;
the second user is a user that communicated with the first user using the second-type communication mode of a communication destination terminal prior to switching to the first-type communication mode of the first communication terminal; and
the specified communication address information is communication address information specified based on an instance of communication address information within the connection information that has another instance of communication address information corresponding to the second-type communication mode used by the first user, and based on the management information, and
wherein in the case where information expressing that a user using the first communication terminal is the first user is not included in the management information, the first user is specified for the first communication terminal based on a location of the first communication terminal as specified by the terminal location specification unit and a location of each of the users as specified by the user location specification unit.

2. The communication system according to claim 1,
wherein each of the multiple communication terminals includes a connection information transmitting unit;
the connection information transmitting unit of at least one of the communication terminals serving as the communication origin terminal and the communication destination terminal transmits the connection information including the communication address information of the communication origin terminal and the communication address information of the communication destination terminal to the management unit in the case where communication has been commenced between the communication origin terminal and the communication destination terminal; and
the following processes (A) through (E) are performed:
(A) the first user is specified as the user that uses the first communication terminal based on the management information;
(B) the connection information having the communication address information of the communication terminal used by the first user specified in (A) is specified;
(C) the second communication terminal having the communication address information of the other communication terminal in the connection information specified in (B) is specified from the management information;
(D) the user of the communication terminal specified in (C) is specified from the management information; and
(E) the user specified in (D) and the communication address information corresponding to the first-type communication mode, which is the communication mode that is to be used, are specified from the management information,
wherein the user specified in (D) is the second user;
the communication address information specified in (E) is the communication address information specified for the second user; and
the first communication terminal displays a screen for communication in the first-type communication mode in which the communication address information specified by the communication support unit has been received, and communicates with the second communication terminal in the first-type communication mode using the communication address information in response to an instruction from the first user.

3. The communication system according to claim 1,
wherein each of the multiple communication terminals or a relay device that relays communication performed by the communication terminals includes a connection information transmitting unit; and
in the case where communication has been commenced between the communication origin terminal and the communication destination terminal, the connection information transmitting unit transmits the connection information including the communication address information of the communication origin terminal and the communication address information of the communication destination terminal to the management unit.

4. A communication terminal capable of communicating with other communication terminals in one or more types of communication modes, the communication terminal comprising:
- a communication support unit that, in the case where a first-type communication mode of the communication terminal is used by a first user, accesses a management unit to specify communication address information corresponding to the first-type communication mode of a second communication terminal used by a second user,
- wherein the communication terminal communicates with the second communication terminal in the first-type communication mode using the specified communication address information;
- the first user is a user that used a second-type communication mode of a communication origin terminal prior to switching to the first-type communication mode of the communication terminal;
- the second user is a user that communicated with the first user using the second-type communication mode of a communication destination terminal prior to switching to the first-type communication mode of the communication terminal; and
- the management unit is a unit that holds management information expressing which type of communication mode corresponding to which communication address information is used by which user and by which communication terminal, and connection information including communication address information of one communication terminal that has communicated and communication address information of the other communication terminal,
- wherein in the case where information expressing that a user using the communication terminal is the first user is not included in the management information, the first user is specified for the communication terminal based on a location of the communication terminal as specified by a terminal location specification unit that specifies locations of communication terminals, and a location of each of the first and second users as specified by a user location specification unit that specifies locations of users.

5. The communication terminal according to claim 4, further comprising:
- a connection information transmitting unit that, in the case where communication has been commenced between the communication origin terminal and the communication destination terminal, transmits the connection information including the communication address information of the communication origin terminal and the communication address information of the communication destination terminal to the management unit.

6. A communication method in which a first communication terminal used by a first user or another communication terminal:
- communicating with a second communication terminal used by a second user or another communication terminal in a second-type communication mode prior to switching to using a first-type communication mode of the first communication terminal; and
- transmitting connection information including communication address information in the second-type communication mode of the first communication terminal or other communication terminal and communication address information in the second-type communication mode of the second communication terminal or other communication terminal to a management unit that holds management information expressing which type of communication mode corresponding to which communication address information is used by which user and by which communication terminal,
- the management unit managing the connection information;
- the first communication terminal accessing the management unit to specify communication address information corresponding to the first-type communication mode of the second communication terminal used by the second user in the case where the first-type communication mode of the first communication terminal is used by the first user;
- specifying communication address information based on an instance of communication address information within the connection information that has another instance of communication address information corresponding to the second-type communication mode used by the first user, and based on the management information; and
- communicating with the second communication terminal in the first-type communication mode using the specified communication address information,
- wherein in the case where information expressing that a user using the first communication terminal is the first user is not included in the management information, the first user is specified for the first communication terminal based on a location of the first communication terminal as specified by a terminal location specification unit that specifies locations of communication terminals, and a location of each of the first and second users as specified by a user location specification unit that specifies locations of users.

* * * * *